July 7, 1970  W. E. HOWALD  3,519,368
COMPOSITE TURBOMACHINERY ROTORS
Filed Sept. 3, 1968  2 Sheets-Sheet 1
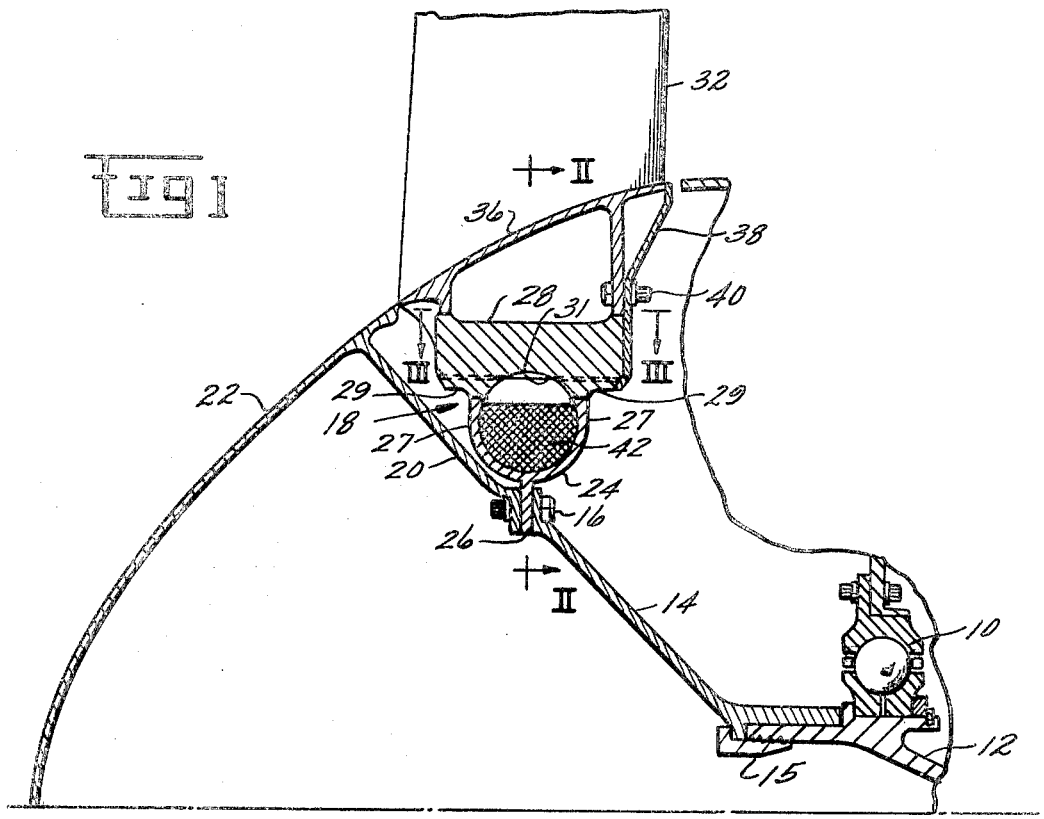
INVENTOR
WERNER E. HOWALD
ATTORNEY

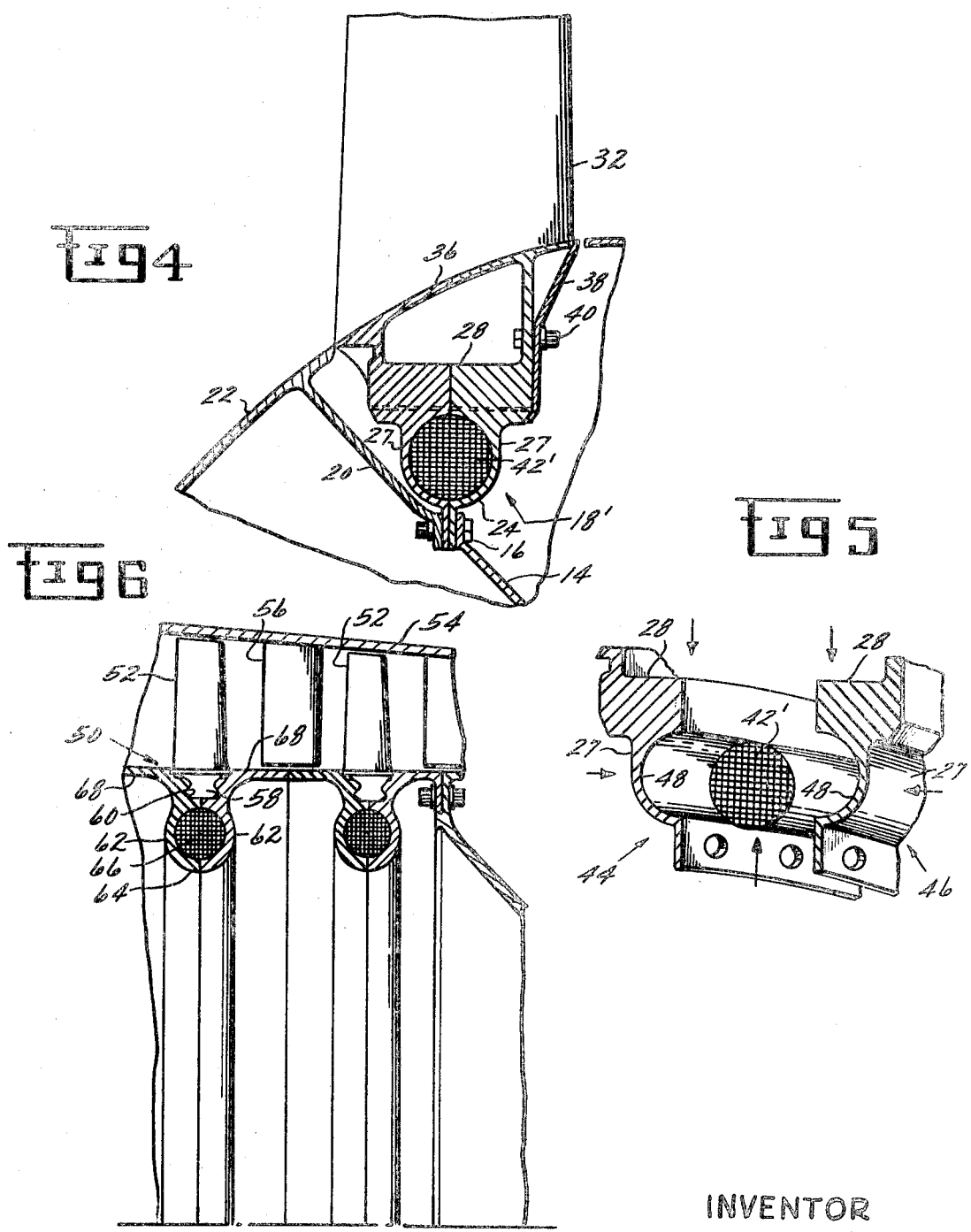

United States Patent Office 3,519,368
Patented July 7, 1970

3,519,368
COMPOSITE TURBOMACHINERY ROTORS
Werner E. Howald, Cincinnati, Ohio, assignor to General Electric Company, a corporation of New York
Filed Sept. 3, 1968, Ser. No. 757,022
Int. Cl. F01d 5/30
U.S. Cl. 416—216                             10 Claims

ABSTRACT OF THE DISCLOSURE

The disclosure shows three forms of compressor rotors in which a wound filament hoop carries substantially all of the tangential loadings on the rotor. The radial loadings of the blades, resulting from centrifugal force, are transmitted through a circumferential yoke member, loaded in tension, to the hoop.

---

The present invention relates to improvements in rotor constructions and, more particularly, to bladed turbomachinery rotors as used in gas turbine engines. The invention herein described was made in the course of or under a contract, or a subcontract thereunder, with the United States Department of the Air Force.

Since the first use of gas turbine engines for the propulsion of aircraft, there has been a pressing need to obtain ever-increasing thrust or power output from a given weight of engine. The need or desirability of such an objective is, of course, obvious from the basic economic gains which can be obtained from resultant increased load capacity and/or flight speed.

In many instances this broad objective can be and has been obtained through the use of higher strength-to-weight ratio structures. Many improvements have been made in this area in regard to both stationary and rotating components of a gas turbine engine. Further, there has been a recognition of the extremely high strength and strength-to-weight ratio capabilites of filament materials such as glass fibers and, more recently, boron and graphite fibers or filaments. These filament materials, because of the crystalline orientation which is obtained in their formation, fabrication, or manufacture, have strengths several times what the same material would have in a homogeneous or amorphous form, as in castings or forgings. There have been many notable uses of these filament materials, but, for the most part, their utility has been limited to unidirectional stress environments or to applications where stresses are relatively low.

Engine rotors have not shown any substantial improvement in their strength-to-weight ratios, other than what has been afforded by improvements in the strengths of homogeneous materials. Rotor designs have, by and large, remained unchanged in their basic concepts. These concepts are predicated upon the use of annular disks having thick (heavy) inner sections adequate to carry the high radial blade loadings as tangential loadings. This design philosophy is necessitated, in most instances, by a requirement for an axial passageway through the rotor. The thickened annular disk also, for reasons well known to those skilled in the art, requires the use of substantial safety factors so that the strength capabilities of the disk materials cannot be fully realized.

One object of the present invention is to provide an improved turbomachinery rotor, particularly adapted for gas turbine engines used in the propulsion of aircraft, which has a significantly improved strength-to-weight ratio and which is capable of operating under stress loadings hitherto unobtainable in any practical sense.

Another object of the invention is to more fully, if not completely, exploit the strength capabilities of filament and homogeneous materials in the fabrication of turbomachinery rotors.

The above ends are attained, in a broad sense, through the provision of a turbomachinery rotor having angularly spaced blades projecting therefrom. The rotor comprises a wound filament hoop and a circumferential yoke portion, embracing the inner surface of the hoop and having radial extending flange portions on opposite sides of the hoop. The blades are secured to both of the flange portions so that radial loadings are carried as tension loadings through the yoke and its flange portions. These radial loads are ultimately carried as tangential tension loads by the hoop. The hoop also carries, in tension, the tangential loading thereon, resulting from high speed rotation.

The above and other related objects and features of the invention will be apparent from a reading of the following description found in the accompanying drawings and the novelty thereof pointed out in the appended claims.

In the drawings:

FIG. 1 is a longitudinal section, through the fan portion or a turbofan engine, illustrating a rotor embodying the present invention;

FIG. 2 is a section taken generally on line II—II in FIG. 1;

FIG. 3 is a section taken on line III—III in FIG. 1 with the rotor blades removed;

FIG. 4 is a longitudinal section through another turbofan rotor illustrating an alternate embodiment of the invention;

FIG. 5 is a fragmentary view illustrating the assembly technique for the rotor of FIG. 4; and FIG. 6 is a longitudinal section through a compressor rotor illustrating another alternate embodiment of the invention.

In FIG. 1, bearing 10 journals the forward end of a shaft 12 of a two-shaft turbofan engine, which may be of well known general construction. A torque cone is secured to the forward end portion of the shaft 12 by a nut 15. The torque cone 14 is secured by bolts 16 to a rotor 18. The bolts 15 also secure a flange 20 to the rotor 18 to mount a bullet nose 22 to the forward end of the fan rotor.

The rotor 18 comprises a circumferential yoke 24 having an inwardly projecting flange 26 through which the bolts pass for securing the torque cone 14 and bullet nose flange 20 thereto. The yoke 24 comprises radial flanges 27, extending outwardly and joined to a rim portion 28 in which curved dovetails 30 are formed in spaced relation around the circumference of the rim 28. Blades 32, advantageously formed by composite materials with a hollow core, are mounted on the rotor 18 by means of tangs 34, at their inner ends, which are appropriately curved and tapered to be received by the dovetails 30. Platforms 36, of thin-wall construction, are secured to the outer surface of the rim 28 to define the inner bounds of the airstream passing through the fan blades 32. A flange 38 is secured to the rotor by means of bolts 40, extending through the rear platform walls, to lock the blades 32 on the rotor (against bullet nose 22), as well as to prevent leakage of air between the inner ends of the blades beneath the platform surfaces.

The yoke 24 and the rim 28 define a ring-like cavity which receives a hoop 42. The hoop is formed of a filament, or filaments, or material having a strength higher, and also, preferably, having a higher modulus of elasticity, than the material from which the yoke 24 is formed. In accordance with today's technology, boron or carbon filaments are preferred selections of filament material. It is well known to those skilled in the art at what diameters these filaments provide extremely high strength characteristics, in the order of 200,000 p.s.i. or greater, and further possess high moduli of elasticity, in the range of $25-50 \cdot 10^6$.

The present rotor comprises the high strength filament hoop and, as structural elements, means formed of a homogeneous material or materials for attaching the blades 32 thereto. The homogeneous material portions comprise the yoke 24 and the rim portion 28, with its circular dovetails 30 providing a removable mounting for the blades. The platforms 36 are not considered as load-carrying elements and may be formed integrally with the blades, as is more conventional with metal blades. The yoke and rim portions are initially fabricated as separate elements, as can be ascertained from the different hatching seen in FIG. 1.

The term homogeneous material is herein used to denote materials, such as cast, rolled or forged metals, which do not have predominant directional strength characteristics as found in filament materials.

The yoke portion 24, prior to its assembly with rim portion 28, defines an annular groove within which the hoop 42 is fabricated. This is preferably done by winding one or more continuous lengths of filament material, under uniform tension, within the annular groove of the yoke so that it is embraced thereby. In most instances it will be preferable that those wound filaments be bonded together in a suitable matrix which, dependent upon operating temperatures and other requirements, could be either a plastic, such as epoxy resin, or a metal, as for example, aluminum. After the filaments have been wound and suitably bonded within a matrix to form the hoop 42, the yoke portion 24 is joined to the rim portion 28. To facilitate attachment, small annular ribs 29 are formed on the inner surface of the rim portion 28. The ribs 29 register with the flanges 27 of the yoke portion 24 and are bonded thereto, advantageously by electron beam welding, so that the yoke 24 and rim portion 28, after assembly, form an integral member. It will also be seen that the inner surface of the rim portion 28 is grooved at 31 between the ribs 29. The groove 31 is of sufficient depth to intersect the dovetails 30 and form openings 33 in their bottom surfaces. The openings 33 enable physical inspection to ascertain the integrity of the welded joint between the yoke portion 24 and the rim portion 28. The groove 31 and the projection of the flanges 27' beyond the hoop 42 facilitates electron beam welding of the flanges 27 to the rim ribs 29.

With the described rotor construction, an extremely high strength-to-weight ratio is obtained. This is better understood by reference to the following basic relationships:

$$\text{Radial stress} = M \cdot R \cdot \omega^2$$

$$\text{Radial strain} = \frac{M \cdot R \cdot \omega^2}{E}$$

$$\text{Tangential stress} = M \cdot R^2 \cdot \omega^2$$

$$\text{Tangential Strain} = \frac{M \cdot R^2 \cdot \omega^2}{E}$$

wherein M=mass, R=radius, $\omega$=rate of rotation and E=modulus of elasticity.

From FIGS. 1 and 2 it will be apparent that the structural portions of the rotor which are formed of homogeneous material, namely, yoke 24, its flanges 27, and the rim 28, are subjected primarily to radial loadings. The dovetails 30 interrupt the continuity of the rim 28 so that there is only a very small or minimal extent of uninterrupted, circumferential portions of homogeneous material beyond the hoop 42.

It will further be noted that the uninterrupted portions of homogeneous material are limited in tangential deflection by the hoop 42. Since these portions are limited in tangential strain, they may be sized primarily to carry radial loads, which are simply a linear function of the working radius as opposed to tangential stresses and strains which are a function of the square of the working radius. By limiting the function of the homogeneous material to carrying radial loads, it is possible to employ lower density materials which further reduce the stress and strain levels by reducing the value of the mass in the equations above. All of this provides the ability to accurately size the homogeneous portions of the rotor at a minimum value, taking full advantage of the strength capabilities of the materials used.

As noted, the hoop 42 restrains tangential deflection of the homogeneous portions of the rotor. It is fundamental that stress is proportional to strain or actual deflection, and, further, that strain is inversely proportional to the modulus of elasticity of the material. By selecting the filaments of hoop 42 with a modulus of elasticity substantially greater than that of the homogeneous material portions of the rotor, the tangential strain induced into these lower strength portions are minimized and the stresses which they carry are maintained well within the strength capabilities of such materials.

Thus, it will be apparent that the unidirectional strength properties of the filaments forming the hoop 42 are fully utilized to carry the tangential loadings inherent in the high speed rotation of a rotor, as well as carrying the radial loadings from the high centrifugal forces on the blades when rotating at high speeds. Further benefits are attained in the present invention by preferably employing materials having a low specific density to reduce the mass factor in the stress-strain relationships. Thus, for example, beryllium is advantageously employed to form the structural, homogeneous material portions, while boron filaments yield similar advantages in forming the hoop 42.

If the homogeneous material has a modulus of elasticity approximating or greater than the hoop filament material, the same benefits of minimizing tangential loadings thereon may be obtained. In such a case the hoop and homogeneous material would be preloaded to obtain the benefits described above.

The rotor 18', of FIG. 4, is similar in general configuration to the rotor 18 of FIG. 1. However, the homogeneous material portions thereof, including the nonstructural platforms, are initially formed as two separate members, split along a parting line, centrally of the hoop 42'. The hoop 42' is preferably completely toroidal in configuration and initially formed as a separate element, as in a mold.

FIG. 5 illustrates the two homogeneous members 44, 46 and hoop 42' positioned for assembly. It will be seen that the diameter of the hoop 42' is somewhat less than that of the semicircular grooves 48 (in the members 44, 46), which are to receive the hoop. By employing known techniques such as the use of differential temperatures, the hoop 42' is expanded and the members 44, 46 contracted (as indicated by arrows in FIG. 5) permitting the members 44, 46 to be brought together in assembled relation (also indicated by arrows in FIG. 5). Thereafter these components are held in assembled relation and the members 44, 46 joined, as by diffusion bonding, to form the integral, composite structure seen in FIG. 4. In the assembly operation the hoop 42' may also be physically forced to an enlarged diameter. The bonding process can be facilitated by selecting materials which can be bonded at temperatures which are compatible with the hoop filaments of matrix.

The net result of these steps is that the homogeneous material portions of the rotor 18', which are to be tangentially stressed, are initially stressed in compression. As the composite rotor structure is tangentially deflected or strained in high speed rotation, these pre-stressed portions will pass through a zero stress condition and then be stressed in tension. However, the maximum stress levels, in tension, tangentially in the homogeneous material are maintained within their physical material capabilities (with a minimum of material and, considering the $R^2$ factor) as full advantage of the load-carrying capabilities of the hoop 42'.

While the prescribed pre-stressing of the rotor is particularly of significance where the hoop modulus of elasticity is not significantly greater than that of the homogeneous material, this feature can be advantageous where such condition does not occur.

FIG. 6 illustrates another type of compressor rotor, indicated generally at 50, wherein a compressor rotor is provided with axially spaced circumferential rows of blades 52. The blades pressurize an annular stream of gas within an outer casing 54 on which are mounted conventional stators 56. Rotor 50 may be journaled and connected to a turbine in conventional fashion. The blades 52 are mounted on the rotor 50 by tanks 58 which are received in circumferential dovetails or grooves 60. The radial force loadings of the blades are transmitted from the dovetails 60 into radial flanges 62 which are formed integrally with a yoke portion 64, surrounding a bonded filament hoop 66. The yoke portion is formed by two members which are essentially split along the center of the toroidal hoop 66, with assembly being accomplished in the same fashion as described in connection with the rotor construction of FIG. 4, the two halves being joined, as by diffusion bonding, to form a unitary composite structure. Axial flanges 68, 70 extend upstream and downstream from the radial flanges 62 with adjacent flanges 68 being joined together, again as by electron beam welding to form a unitary rotor structure 50.

The radial loadings of the blades 52 are transmitted through the flanges 62 and yoke 64 as tangential hoop loadings on the hoop 66, and the advantages previously described in connection with FIGS. 1-3 and 4 are also enjoyed in this type of construction.

While the description herein has been directed to compressor rotors embodying the present invention, the same benefits may also be enjoyed in turbine rotors, as well as other rotating structures of gas turbine engines. Further, other modifications of the described embodiments will occur to those skilled in the art, within the scope of the present inventive concepts which are to be derived solely from the following claims.

Having thus described the invention, what is claimed as novel and desired to be secured by Letters Patent of the United States is:

1. A turbomachinery rotor having angularly spaced blades projecting radially therefrom, said rotor comprising,
   a hoop formed of circumferentially ending filaments and
   a circumferential yoke portion, embracing the inner surface of said hoop and having radially extending flange portions on opposite sides of said hoop,
   said blade being respectively secured to both of said flange portions,
   whereby, when the rotor is rotating at high speeds, the radial loadings thereon are taken primarily as tension loads through the yoke and its flange portions, and such radial loads are ultimately carried in tension loads by the hoop as the hoop also carries tangential loadings, in tension, resultant from rotation,
2. A turbomachinery rotor, as in claim 1, wherein, said yoke portion is formed of a homogeneous metal material and has continuous circumferential portions.
3. A turbomachinery rotor as in claim 2 wherein, the modulus of elasticity of the hoop is greater than that of the material forming the yoke portion.
4. A turbomachinery rotor as in claim 2 wherein, the hoop is tangentially pre-stressed in tension and the yoke portion embraced thereby is tangentially pre-stressed in compression.
5. A turbomachinery rotor as in claim 4 wherein, the yoke portion is formed by two members bonded together on a plane central of said hoop to form a unitary yoke portion.
6. A turbomachinery rotor as in claim 5 wherein, a rim portion is joined to the outer ends of the yoke portion flanges and dovetails extend across said rim for the attachment of individual blades thereto.
7. A turbomachinery rotor as in claim 4 wherein, a rim portion is joined to the outer ends of said yoke portion flanges and a circumferential dovetail is formed in said rim portion, centrally of said hoop, to provide for mounting of said blades.
8. A turbomachinery rotor as in claim 2 wherein, a rim portion is joined to the outer ends of said yoke portion flanges and dovetail means are provided for individually mounting blades on said rim portion, and
   an attaching flange projects inwardly from the yoke portion to enable joining of the rotor to other rotating elements.
9. A turbomachinery rotor as in claim 8 wherein, the rim portion has a pair of circumferential rims on its inner surface which are bonded to the yoke portion flanges to form an integral structure, and further wherein,
   a groove is formed on the inner surface of said rim portion between said ribs and dovetails extend across said rim portion and form, in combination with said grooves, openings,
   thereby providing means for mounting individual blades on the rim portion and providing access for visual inspection of the bonded attachment of the rim portion to the yoke portion.
10. A turbomachinery rotor as in claim 8 wherein, the yoke portion and the rim portion are formed by separate members bonded together along a plane central of said hoop to form an integral structure.

References Cited

UNITED STATES PATENTS 2,155,231 4/1939 Hubbard et al.
3,216,654 11/1965 Kappus.
3,309,058 3/1967 Blackhurst et al.
3,403,844 10/1968 Stoffer.

FOREIGN PATENTS 1,059,290 6/1959 Germany.

EVERETTE A. POWELL, JR., Primary Examiner

U.S. Cl. X.R.

416—244

PO-1050
(5/69)

UNITED STATES PATENT OFFICE
CERTIFICATE OF CORRECTION

Patent No. 3,519,368                   Dated  July 7, 1970

Inventor(s)      W. E. Howald

It is certified that error appears in the above-identified patent and that said Letters Patent are hereby corrected as shown below:

Column 5, line 49, after "circumferentially" delete ending and insert in place thereof --extending--.

Column 5, line 61, after "rotation" delete , and insert in place thereof --.--.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents